INVENTOR.
HARRIS A. STOVER
BY R. W. Andersen
AGENT

INVENTOR.
HARRIS A. STOVER

BY R. W. Anderson
AGENT

INVENTOR.
HARRIS A. STOVER

BY R. W. Anderson

AGENT

United States Patent Office 3,714,375

Patented Jan. 30, 1973

3,714,375

SECONDARY PHASE MODULATED COMMUNICATIONS SERVICE VIA AM BROADCAST STATIONS

Harris A. Stover, Cedar Rapids, Iowa, assignor to Collins Radio Company, Cedar Rapids, Iowa Filed Oct. 16, 1970, Ser. No. 81,216
Int. Cl. H04m *11/00*
U.S. Cl. 179—2 E 8 Claims

ABSTRACT OF THE DISCLOSURE

A secondary communications system for use with AM broadcast stations employs encoding predefined messages which may be initiated by dialing predetermined decimal digits or initiatng touch-tone sequences in the telephone system, converting these digits to a predetermined binary code sequence or binary "word," and transmitting the code word by a non-interfering phase modulation of the AM broadcast station carrier wave. Subscriber receivers, fixed-tuned to the broadcast station carrier, are equipped with simple code recognition means which, in response to reception of one or more preassigned coded "words," activate associated indicators to visually or audibly annunciate predetermined messages to the subscriber.

GENERAL STATEMENT OF OBJECT

This invention relates generally to radio paging systems and more particularly to a radio paging system utilizing the facilities of existing amplitude modulated broadcast stations and being compatible with existing AM broadcasting systems.

In general the object of the present invention provides a means of supplementing existing AM broadcast station equipments with a secondary communication service by means of which radio paging is permitted from any telephone in the normal telephone system to any one of a number of small subscriber paging receivers, in a manner compatible and in no way interfering with normal AM programming.

BACKGROUND OF THE INVENTION

In the past two decades an immense growth of the numbers and kinds of telecommunications teachnology and applications has been experienced. A large proportion of these applications involve transmission through the atmosphere. The electromagnetic spectrum used for these transmissions is a unique natural resource which is not depleted by use, but its value may be greatly reduced by misuse. A constant demand for more radio services within the available spectrum is recognized as approaching a crisis stage particularly in frequencies below 30 mHz.

A rapid growth has been experienced in the estabilshment of communication with particular individuals when they are away from their offices or central places of business. One approach used is a voice transceiver in a central location and a portable voice transceiver carried by the individual to the remote location. A number of frequency allocation assignments in the VHF and UHF voice channels exist for this puropse, the demand for which is ever increasing.

In the midst of the crisis concerning an already overcrowded frequency spectrum, and the constant demand for additional allocations by individuals and businesses alike, there exist over 4,000 amplitude modulated broadcast stations which might be deemed as providing only a portion of the service they could provide.

SUMMARY OF THE INVENTION

In accordance with the present invention AM broadcast stations may provide a radio paging service with no increase in existing spectrum allocations and with complete compatibility with existing AM broadcasting.

The system to be described operates on a subscriber basis and is based on the realization that complete two-way voice conversations in many instances are not required. In many instances simple messages such as "go to the nearest telephone and call your office" or "return to your office at once" would provide the necessary paging communication between a remote subscriber and his home or office. In these instances a simple audible or visual indicating device selectively triggered by a signal from a broadcast station is proposed in a system that does not interfere in any way with the station's normal operations. Since broadcasting stations use relatively high power, the area over which the individual could be paged would be many times the area over which he could be reached by most of the existing two-way mobile units used for voice transmission.

Accordingly, it is an object of the present invention to provide a paging system whereby an AM broadcast station equipped with the system as described can provide radio paging from any telephone in the normal telephone system to any small paging receiver compatible with the system as described. The system in no way interferes with normal station operation or programming and provides wide area paging service within the broadcast station coverage area.

The invention is featured in the provision of encoding predefined messages which may be initiated by dialing predetermined decimal digits or initiating touch-tone sequences in the telephone system, converting these digits to a predetermined binary code sequence or binary "word," and transmitting the code word by a non-interfering phase modulation of the AM broadcast station carrier wave. Subscriber receivers, fixed-tuned to the broadcast station carrier, are equipped with simple code recognition means which, in response to reception of one or more preassigned coded "words," activate associated indicators to visually or audibly annunciate predetermined messages to the subscriber.

The present invention is further featured in a means for encoding predetermined binary "words" into minimal cremental phase shift increments and phase modulating the carrier of an AM station in accordance therewith in a manner which does not interfere with existing AM broadcast services.

These and other features and objects of the present invention will become apparent upon reading the following description with reference to the accompanying drawings in which;

Figures 1, 3:
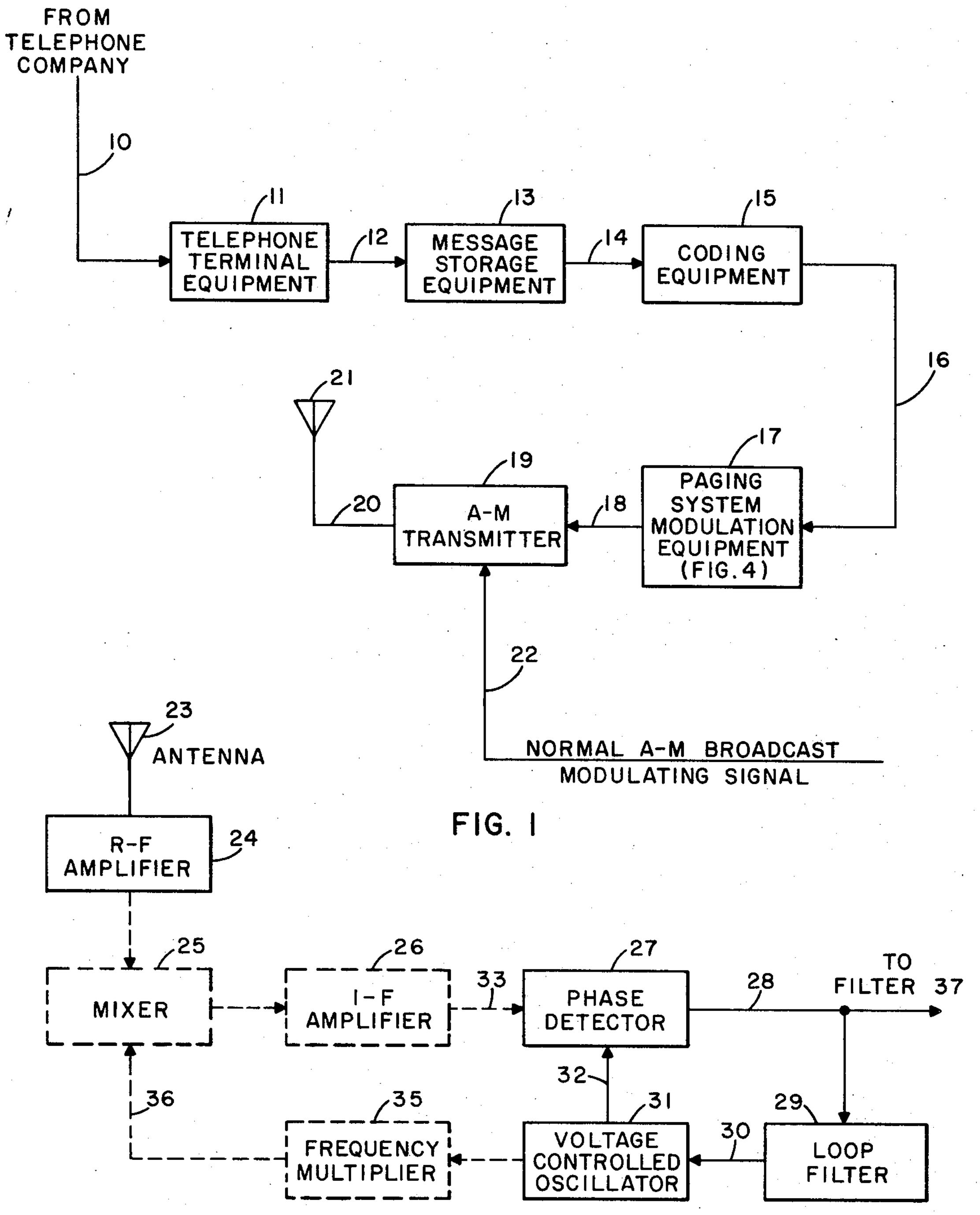
FIG. 1 is a functional block diagram of the transmitting system in accordance with the present invention.
FIG. 3 is a functional diagram of a modification of a receiving system.

The present invention will first be discussed with respect to utility and general functioning.

Assume that a delivery man is away from the office and a call comes to the office indicating that he should stop and pick up a package before returning. If the delivery man is equipped with two-way voice radio which is currently widely used, this communication facility could be used to contact him unless he happened to be away from the truck or out of the useful range of the two-way radio. Repeated calls might eventually reach him, however, this procedure is obviously wasteful of radio spectrum if the simple message "please call your office" is all that is required. Now assume that this delivery truck is beyond the range of two-way voice radio systems, but it is equipped with a small receiver for an AM broadcasting station paging system as herein described. In accordance with the present invention, an office telephone call to the paging service signal generator at the AM broadcast station would initiate a standard telephone connection in response to which an additional preassigned number may be dialed corresponding to a particular message to be received only by the particular paging receiver in the truck. Signal processing equipment at the transmitter would code the second dialed number for transmission so that it would trigger only the indicator corresponding to that particular message on only that one receiver without affecting any of the other indicators associated with that particular receiver or any of the other subscriber receivers in the system. In accordance with the present invention each receiver may have a multiplicity of indicators corresponding to several desired messages. These indicators may be either audible or visible or both. The decided advantage is thereby realized in that the delivery man may be away from the truck when the transmission occurs but the message would be received and the indicator continually activated until the delivery man returned to the truck, notes the message, and deactivates the indicator. A further decided advantage to a system such as will be herein described is that a multiple message paging receiver would enunciate and "store" more than one message made possible by subsequent dialing of a further special number sequence corresponding to an assigned second message. With this general operational feature in mind, a convenient, simple, compatible, and non-interfering paging system in accordance with the present invention will be described which utilizes existing broadcast spectrum.

DISCUSSION OF PRIOR ART

The system utilizes phase modulation of the amplitude modulated broadcast carrier. Although such phase modulation approaches have previously been considered in the art, such systems have been incapable of performing a paging function using AM broadcast stations, or those proposed for broadcast station utilization have not performed the function without interfering with normal broadcast programming or without requiring additional transmission bandwidth requirements. The system of the present invention is completely compatible with AM broadcasting, is completely non-interfering with AM receivers, requires no additional frequency allocations, and performs within the carrier frequency stability requirements currently imposed on broadcast station frequency allocations.

DESCRIPTION OF PREFERRED EMBODIMENT

Telephone system interface

FIG. 1 illustrates an AM broadcast transmitting site functionally modified in accordance with the paging system of the present invention. The block diagram of FIG. 1 includes an AM transmitter designated by reference numeral 19 to which is applied a normal AM broadcast modulating signal 22. The modulated carrier is applied on line 20 to a transmitting antenna 21. This position constitutes the normal AM broadcast transmitter. The remainder functional blocks depicted in FIG. 1 illustrate modifications in a general operational sense by means of which the transmitter is adapted to provide paging system service. An input line or lines 10 from the conventional telephone service is shown. The input line 10 is applied to a telephone terminal equipment designated by reference numeral 11 which terminates the input telephone line or lines and conventionally provides an audible indication to the subscriber when the telephone line has been connected to the succeeding storage unit 13 in the diagram. The message storage equipment 13 is utilized since incoming messages may not arrive properly spaced in time so that they may be directly coded and applied to the transmitter 19. Since it is highly likely that several subscribers might call at nearly the same instant of time, the system might desirably have several incoming telephone lines serviced by the single telephone terminal equipment 11. A message storage equipment 13 then accepts individual or simultaneously arriving messages, stores them, and through known expedients in the art arranges them in a correctly timed serial sequence for presentation to the coding equipment 15. Coding equipment 15 encodes the incoming telephone pulses or touch-tones into a binary code for presentation on line 16 to the paging system modulation equipment 17. Although FIG. 1 illustrates the message storage equipment 13 as preceding the coding equipment 15, the reverse situation might be embodied wherein the coding is accomplished prior to storage.

The blocks 11, 13, and 15 of FIG. 1 thus depict an interface, of sorts, between the particular paging system modulation equipment 17 of the present invention and the telephone system. Telephone terminal equipments, message storage equipments, and code converting equipments exist as state of the art devices by means of which this particular group of functions might be implemented. As such, no further detail description of this interface equipment will be described herein, it being emphasized that the general function is to convert predetermined patterns of pulses or touch-tones received from conventional telephone dialing equipment into a particular binary code sequence for presentation to the phase modulation equipment of the present invention.

GENERAL DESCRIPTION OF PAGING MODULATOR

The paging system modulation equipment, block 17 of FIG. 1, must modulate the transmitter carrier with the coded paging information without interfering with the normal AM broadcast function of the broadcasting station. In accordance with the presence invention a low rate phase modulation scheme is embodied in block 17, details of which will be further considered. For example, the phase of the transmitter carrier might be advanced 10° for each mark and retarded 10° for each space of a paging code developed by the coding equipment 15 and the rate of phase advance or retardation might be chosen to be, for example, 100 symbols per second, or less. This particular approach has a decided advantage in that a phase shift is produced for each mark or space symbol by means of which the message is encoded, and permits a more economical receiving system than one requiring synchronization, it being realized, however, that such approaches would be feasible.

The advancement or retardation of phase by 10° for each respective mark or space and at a rate less than 100 symbols per second makes possible a phase modulation system which does not interfere with the normal amplitude modulation broadcast programming. Assuming worst cases where a sequence of all marks or all spaces were to be transmitted at a rate of 100 marks or spaces per second, the phase of the transmitted carried would be continually shifted forward by 1,000 degrees per second, corresponding to less than 3 Hz. of frequency shift in the worst case since any combination of marks and spaces would produce an even lower frequency shift. Thus in that the station be within 20 Hz. of its assigned frequency shift is well within the carrier frequency stability requirement for AM broadcast stations which defines that the station be within 20 Hz. of its assigned frequency in the spectrum. Normal amplitude modulation receivers are insensitive to this type of modulation, thus the paging service in no way interferes with the normal broadcasting service and listeners to conventional AM programming will be unaware that the broadcast station is providing an additional communication service throughout its service area.

The modulation scheme may generally be defined as imparting a phase shift increment of 360/N degrees for each mark or space to be transmitted. The rate of transmission (bit rate) may be selectively varied. The product of the bit rate and the 360/N degree phase increment defines the maximum frequency shift which may be imparted to the carrier. Thus phase shift increments of five degrees at a rate of 200 each second defines a worst-case carrier frequency shift of 1,000 degrees per second (less than 3 Hz.) the same as the above discussed ten-degree increment with bit rate of 100 per second.

Details of the paging system modulation equipment, block 17 of FIG. 1, will be further described. Let it be assumed that the modulation equipment block 17, through its tie-in through line 18 with the AM transmitter 19 of FIG. 1, phase modulates the carrier of the broadcast station by 10° phase shift increments as generally described above. This modulation might then be applied on line 18 to the transmitter exciter for it is to be understood both normal amplitude modulation programming and paging service phase modulation will be imparted to this system.

DETAILED DESCRIPTION OF SUBSCRIBER RECEIVER

Figure 2:
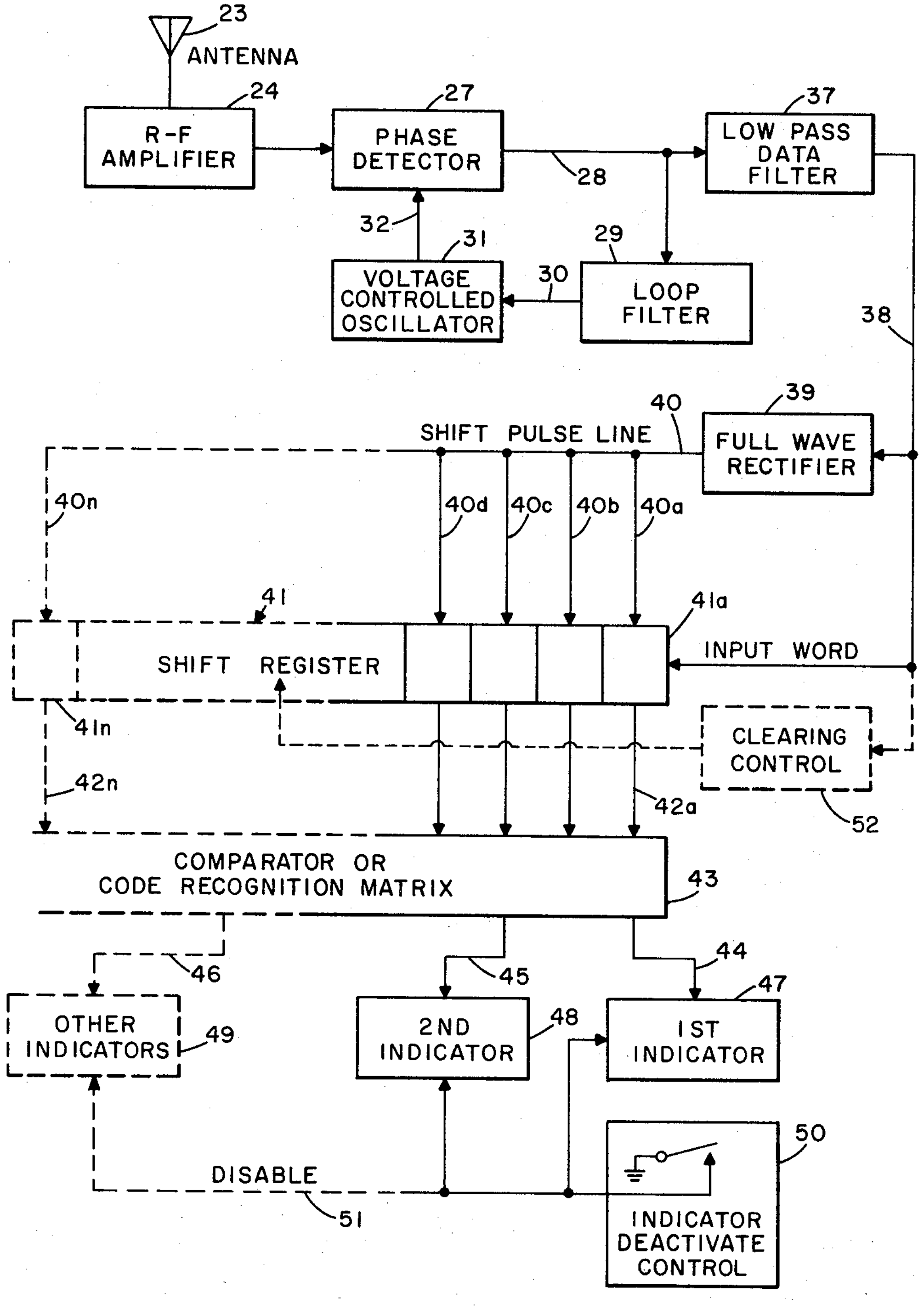
FIG. 2 is a functional diagram of a subscriber receiver in accordance with the present invention.

FIG. 2 illustrates the functional diagram of a paging receiver. The station signal from antenna 23 is applied to a fixed tuned RF amplifier 24 the output of which is applied as a first input to a phase detector 27. The second input to phase detector 27 is comprised of the output 32 of voltage controlled oscillator 31 which operates at a frequency equal to the carrier frequency of the AM broadcast transmitter to which the paging receiver is tuned. The output 28 of the phase detector is passed through a loop filter 29 and is then utilized to control the frequency and phase of the voltage controlled oscillator 31. Phase detector 27, loop filter 29, and voltage controlled oscillator 32 comprise a phase-locked loop which locks the phase of the voltage controlled oscillator 31 ninety degrees out of phase with a received carrier. The bandwidth of this phase-locked loop is then adjusted so that it is wide enough to follow the average rate of phase shift of a sequenc of all marks or all spaces which continually shift the phase in one direction, but it is narrow enough that it cannot accurately follow the phase transitions associated with each individual phase shift. The phase locked loop bandwidth is thus so adjusted that it requires some time to correct the error in the voltage controlled oscillator 31 following each phase transition of a given coded input sequence, but this time must not be so great that it cannot follow a sequence of phase shifts in one direction. Thus for each phase shift in the succeeding bit making up the coded input word from the transmitter a decaying error signal pulse is caused to occur at the output 28 of phase detector 27. This error signal will have one polarity for transmitted "marks" and another polarity for transmitted "spaces." The output 28 of the phase detector is the detected data signal. Low pass filter 37 receives the detected data signal and removes high frequency noise.

Each receiver in this system will receive and detect all phase coded transmission but will respond only to one or more code words assigned to the particular subscriber. This may be implemented in a non-complex manner in the receiver of FIG. 2 as follows.

The output of the low pass data filter 37 of FIG. 2 was defined as being a series of error pulses from the phase detector having one polarity for code bits of a first state and another polarity for code bits of a second state, such as marks and spaces. There will thus be a phase detector output pulse for each bit of the binary word in the transmitted code. The output 38 of the low pass data filter 37 is applied to a shift register 41 and through a ful wave rectifier 39 to develop a series of unipolarity pulses on line 40 which may be utilized to shift the input data word into the register 41. Register 41 is illustrated as being comprised of a preselected number of stages 41*a*–41*n* to which the shift pulse output from full wave rectifier 39 is applied individually on respective shift lines 40*a*–40*n*. The conductive or binary state of each of the stages in shift register 41 as carried on read-out lines 42*a*–42*n* are continually and individually monitored in a comparator or code recognition matrix 43. The code recognition matrix 43 is tailored to the particular preassigned codes for a particular subscriber and thus the data stored in the shift register 41 is continually compared with particular codes assigned to this particular receiver. When the recognition matrix 43 recognizes the code corresponding to a particular indicator, it transmits an activating pulse to an assoicated indicator. The receiving system of FIG. 2 is illustrated as comprising a first indicator 47 and a second indicator 48, it being realized that any one particular receiver might comprise any number of indicators indicated functionally as the block 49, each indicator being activated by a particular preassigned word code and each indicator when activated providing a visual or oral enunciation.

Shift register 41 might be comprised of any number of stages corresponding to the number of bits making up each transmitted "word." The code word capacity of a particular paging system is thus established by the selected code word bit length. For example, use of code words 20 bits in length establishes a word capability of $2^{20}$ or well over one million.

The receiving system of FIG. 2 functionally depicts an indicator deactivator control which might be comprised of one or more pushbuttons, for example, by means of which an activated indicator may be disabled and readied for an ensuing paging message. Numerous state of the art means might be employed by means of which each of the indicators embody a holding function to enable it to be enunciated by a single output pulse from the recognition matrix 43 and continue to be activated until the hold function is disabled. This is functionally depicted as a selective ground operation for block 50 in FIG. 2.

FIG. 2 illustrates in dashed configuration a clearing control 52 receiving the data stream and developing an output for application to shift register 41 for the purpose of clearing the shift register after each succesive word transmission. It is to be realized that in a non-synchronous system some means of defining the beginning or end of each coded word transmission is necessary to ready the shift register for the reception of a subsequent word. One method of accomplishing this might be to clear the shift register as depicted functionally by clearing control 52. Clearing control 52 might, for example, include a timer such that whenever a time exceeding a predetermined length of time occurs between the pulses defining a transmitted word, a reset pulse would be generated to reset the shift register 41. Transmitter coder 15 of FIG. 1 might then embody a timer which would precede each valid code word transmission with a pause of sufficient length to allow the receiver shift registers in the system to reset.

A further alternative might employ the transmission of a sequence of all "zeros" (or "ones") of length at least as long as the number of stages in the system shift registers or the number of bits in a valid paging word. In this case the first bit of each valid paging word would have to be a "one" (or a "zero" if "ones" were used for clearing).

Should the sytem be synchronous, the receiver might synchronize with the transmitted signal and the comparator or code recognition matrix 43 be activated briefly following the last bit of each transmitted word. It should be emphasized that the asynchronous type of system has been emphasized in this description since it generally simplifies the receiving equipmentand renders the system more economical.

In some situations it may be difficult to supply sufficient amplification at the signal frequency in RF amplifier 24 of the receiving system of FIG. 2. A modification of the FIG. 2 receiver is indicated functionally in FIG. 3 whereby the superheterodyne principle is incorporated to provide part of the amplification at an intermediate frequency. In FIG. 3 the received signal is applied from antenna 23 to RF amplifier 24 with the output of the amplifier 24 being applied to a mixer 25 rather than directly as a first input to phase detector 27. A second output from voltage controlled oscillator 31 is applied to a frequency multiplier 35 the output 36 of which constitutes a second input to mixer 25. A harmonic of the voltage controlled oscillator output frequency may thus be phase locked to the carrier component of the IF signal and provide a second input to the mixer 25 on line 36. A second oscillator is thus unnecessary. To visualize the frequency relationships under these conditions, let $a$ represent the frequency of the received signal, let $b$ represent the IF frequency, which is the same as the frequency of the voltage controlled oscillator, and let $n$ be the harmonic of the oscillator which is used for the mixer. Then $$b=\frac{a}{n-1}$$

if the signal is on the high frequency side, or $$b=\frac{a}{n-1}$$

if the signal is on the low frequency side. Thus $n$ may be selected to provide a desirable relationship between the IF frequency and the received signal frequency. Alternatively, though not illustrated, separate oscillators could be used for the mixer and the phase detector.

The modulation system by means of which the paging service is included in a compatible sense with a normal AM broadcast function has thus far been described in terms of operational characteristics—that is, of converting a binary code word of a predetermined number of bits into respective phase advances and retardations of the transmitter carrier. The receiving system has been defined as one decoding this phase shift information and causing certain enunciators to be activated.

DETAILED DESCRIPTION OF PAGING SYSTEM MODULATOR

Figure 4:
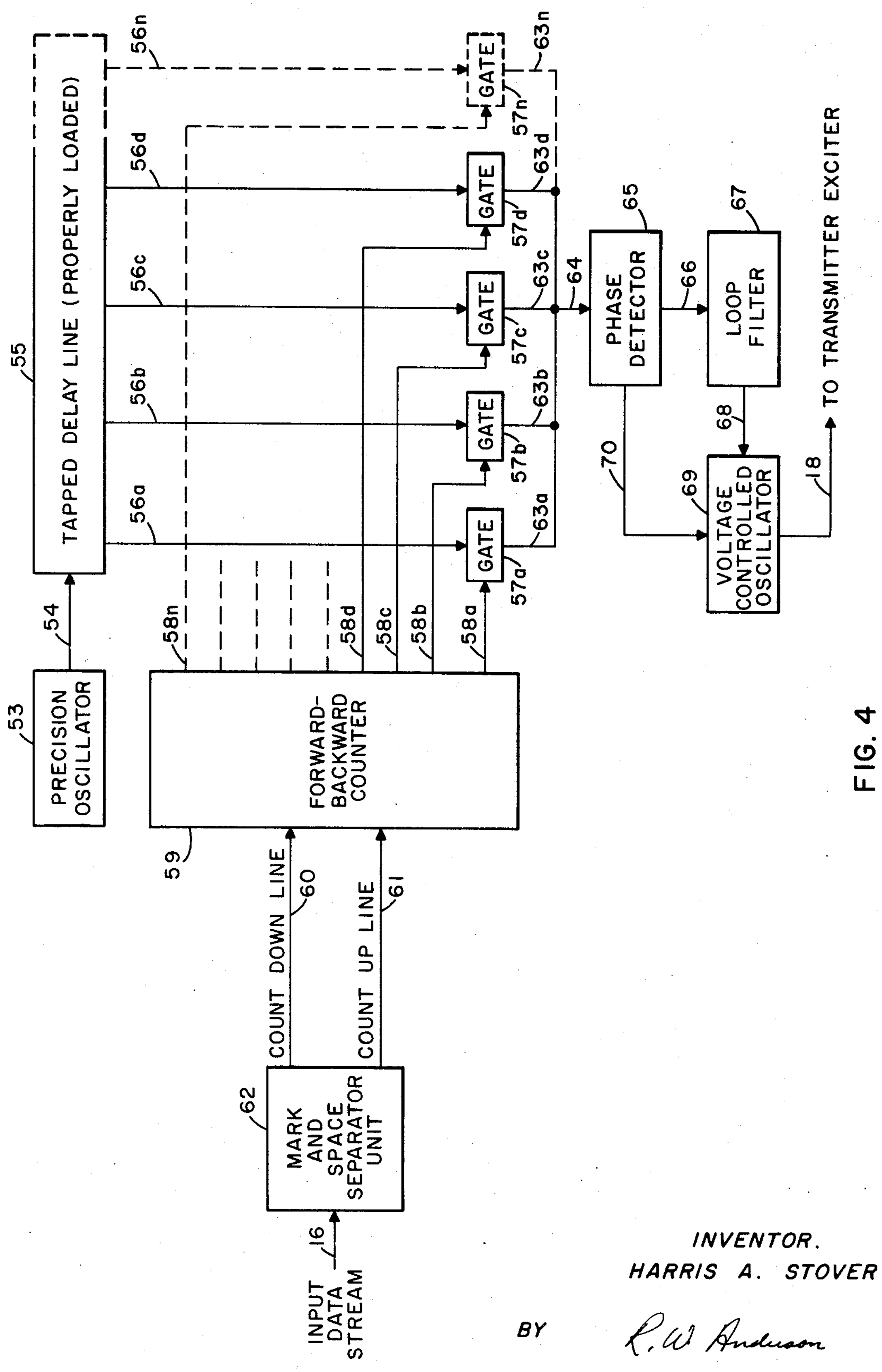
FIG. 4 is a functional diagram of the phase modulation means of the present invention.

A particular paging system modulator system providing the aforedefined functions is depicted functionally in FIG. 4. The precision oscillator 53 is the basic frequency determining oscillator for the transmitter. The output 54 from oscillator 53 is fed into a tapped delay line 55 which might have 36 outputs taps as 56*a*–56*n* to provide an output every ten degrees. The input data stream 16, previously described as coming from the telephone terminal and storage encoding functions of FIG. 1, is illustrated as being applied to a mark and space separator unit such that all marks of a given input data stream are applied to a first line 60 while all spaces are supplied to a second line 61. Lines 60 and 61, containing the respective marks and spaces of an input data stream, are applied to a forward-backward counter 59. Counter 59 comprise any number of state of the art devices that will count "up" for pulses on one input line and count "down" for pulses on the other input line. In the illustrated embodiment, counter 59 would be a thirty-six stage counter (corresponding to the number of delay line output taps) and include any one of a number of known expedients so as to provide one of 36 line separated outputs 58*a*–58*n* in response to the particular count contained in counter 59 at any instant. Thus if the input data bit is a space, counter 59 will count up one state from some existing count to generate an output on the counter output line one step to the right of that line upon which the previous output appeared. Conversely, if the input data is a mark, counter 59 would count down one count from the existing count and provide an output on that output line one step to the left. The counter output lines, which function as a distributor or sequencer, are applied as enabling input lines to gates 57*a*–57*n*, respectively. The gates are connected to respective ones of the sequential delay line output taps. Outputs 63*a*–63*n* from the gates are applied in common to line 64 as an input to phase detector 65. If and when gates 56*a* and 56*n* associated with the respective ends of the delay line 55 are enabled, and the input data stream defines a subsequent phase shift in the same direction, an additional count in the same direction shifts to the gate at the other end of the delay line. Thus there is no limit to the number of cycles of shift that may be made in either direction.

The mark and space bits making up the input data stream 16 are thus converted to corresponding phase retardations and advancements of the signal from precision oscillator 53 and applied on common line 64 as first input to a phase detector 65. A voltage controlled oscillator 69 provides the other input to phase detector 65. The output of the phase detector is fed through a loop filter on line 66 with the output of filter 67 being applied on line 68 as a controlling input to voltage controlled oscillator 69 such that the oscillator is maintained in phase with the output of whichever gate is passing a signal from the delay line 55. The loop filter 67 limits the maximum rate of change of the oscillator phase and, therefore, prevents generation of any spurious frequencies. The output 18 of the voltage controlled oscillator 69 is the phase modulated output of the paging modulator depicted as output 18 in FIGS. 1 and 4. The output 18 is used as a carrier frequency source for the AM broadcast transmitter 19 of FIG. 1.

SUMMARY

The present invention is thus seen to provide a paging service utilizing phase shift of an AM transmitter carrier by means of which a secondary communication device may be provided by conventional AM broadcasting which in no way affects the normal service function. No increase in bandwidth allocation is necessary; no modification in existing AM receivers is necessary for complete compatibility since such receivers are insensitive to the maximum frequency shift imparted in a worst case condition by the paging modulation scheme. Since there is a phase shift imparted for each and every bit of the encoded data stream, the receiver function is simplified in not requiring synchronization functions. The receiver is thus a relatively simple fixed-tuned device.

Although the present invention has been described with respect to particular embodiments thereof, it is not to be so limited, since changes may be made therein which fall within the scope of the invention as defined in the appended claims.

I claim:

1. A secondary communication means compatible with an amplitude modulation broadcast transmitter, comprising means for phase modulating the carrier of said amplitude modulation transmitter in accordance with predetermined binary encoded message sequences, each of said message sequences comprised of a plurality of N bits each definable by one of two possible states, said transmitter including a precision oscillator source, control means responsive to said binary encoded input sequences to retard the phase of the output of said precision oscillator by $360/N$ degrees with respect to the instant phase thereof in response to each binary input bit of a first state and to advance the phase of the output of said precision oscillator by $360/N$ degrees with respect to the instant phase thereof in response to input data bits of a second state, the phase established by each incremental phase shift serving as reference phase from which a next succeeding one of said incremental phase shifts is imparted, said phase shifted precision oscillator signal comprising the carrier frequency determining source of said amplitude modulation transmitter, phase shift responsive receiving means for receiving said amplitude and phase modulated signal from said amplitude modulation transmitter, said receiving means comprising means responsive to at least one of said plurality of said phase encoded message sequences to activate an associated indicator which is effective in annunciating a predetermined message, and receiver associated means to deactivate said associated indicator and ready said receiving means for a subsequent reception of an assigned one of said plurality of ph-se encoded message sequences.

2. A communication means as defined in claim 1 further comprising means to connect said phase shifted precision oscillator signal as a first input to a phase detector, a voltage controlled oscillator, the output of said voltage controlled oscillator being applied as a second input to said phase detector, the output from said phase detector being passed through a low pass filter, the output from said low pass filter being applied as a controlling input to said voltage controlled oscillator, the output from said voltage controlled oscillator being applied to said transmitter as a carrier frequency determining source.

3. A communication means as defined in claim 2 wherein said control means comprises a continuous bi-directional counter, said bi-directional counter being responsive to said message defining binary input bits of a first state to advance the count in said counter by one count and responsive to binary input bits of a second state to reduce the count in said counter by one count, means associated with said counter to develop an output impulse on a particular one of N output lines in response to each count within the capability of said counter, delay means comprising a delay line receiving the output from said precision oscillator source, said delay line having N successive output taps defining successive delay increments equal to $360/N$ degrees, means responsive to output impulses on said counter output lines to gate the output from an associated one of said delay line taps to a common line comprising said first input to said phase detector, whereby said binary encoded input message sequences are converted to discrete incremental phase shift advances of said precision oscillator output signal for each binary input bit of a first state and like incremental phase shift retardations of said precision oscillator output signal for each input binary data bit of a second state.

4. A communication means as defined in claim 3 wherein said receiving means comprises means for converting said phase encoded message bits to a binary voltage signal format and storing said binary voltage signal, means for comparing said stored signal with at least one predetermined assigned code, and means for activating an associated indicator in response to coincidence between said stored signal and said predetermined assigned code.

5. A communication means as defined in claim 4 wherein said receiver means for converting comprises a further phase detector receiving said phase modulated signal as a first input thereto, to the output of said further phase detector applied to a loop filter, a further voltage controlled oscillator receiving the output of said loop filter, the output of said further voltage controlled oscillator applied as a second input to said further phase detector, the output of said further phase detector comprising signal impulses of a first polarity in response to phase retardations of said received signal and comprising signal impulses of a second polarity in response to phase advances of said received signal, a full-wave rectifier receiving the output of said further phase detector and converting the output thereof to like polarity impulses, a shift register receiving the output from said further phase detector as a serial input to the first stage thereof, means for applying the output from said full-wave rectifier as a shift pulse source to said shift register, means for applying the output of each stage of said shift register to code comparator means, and said comparator means developing an output to activate said indicating means upon a predetermined coded input word being entered into said shift register.

6. A communication means as defined in claim 5 wherein said receiving means further comprises signal mixing means to which said received signal is applied as a first input, the output of said signal mixing means being applied to an intermediate frequency amplifier, the output of said intermediate frequency amplifier comprising said first input to said further phase detector, and the output of said further voltage controlled oscillator being applied through a frequency multiplier the output of which is applied as a second input to said signal mixing means.

7. A communication means as defined in claim 1 further comprising means for converting decade encoded calling sequences from telephone terminal equipment to binary coded sequences, said binary coded sequences comprising said input binary data stream.

8. A system as defined in claim 1 wherein the bit rate of said phase modulation is such that the product of said bit rate and said phase shift increments of $360/N$ degrees defines a maximum possible frequency shift of the transmitted carrier which is less than that defining the drift tolerance of the assigned carrier frequency of said broadcast station.

References Cited

UNITED STATES PATENTS

| | | | |
|---|---|---|---|
| 3,004,155 | 10/1961 | Brite | 325—139 |
| 3,160,812 | 12/1964 | Scantlin | 325—139 X |
| 3,239,671 | 3/1966 | Goode | 325—40 X |
| 3,406,343 | 10/1968 | Mehlman | 325—139 X |

HAROLD I. PITTS, Primary Examiner

U.S. Cl. X.R.

325—40; 139

UNITED STATES PATENT OFFICE
CERTIFICATE OF CORRECTION

Patent No. 3,714,375 Dated January 30, 1973

Inventor(s) Harris A. Stover

It is certified that error appears in the above-identified patent and that said Letters Patent are hereby corrected as shown below:

Column 2, line 43, "cremental" should read --incremental--

Column 7, line 25, the equation should read -- $b = \frac{a}{n + 1}$ --.

Signed and sealed this 29th day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334